US011506417B2

(12) United States Patent
Kandasamy et al.

(10) Patent No.: US 11,506,417 B2
(45) Date of Patent: Nov. 22, 2022

(54) DAMPERS PLACED ON THE HALF FACE OF THE INLET AND THE OUTLET OF SIDE-BY-SIDE AIRFLOW ENERGY RECOVERY SECTIONS USED AS RECIRCULATION PATH

(71) Applicant: TRANE INTERNATIONAL INC., Davidson, NC (US)

(72) Inventors: Ganeson Kandasamy, Lexington, KY (US); Yuvaraja Kandasamy, Bangalore (IN); Asit Mahanta, Bangalore (IN); Arul Thangavelu Ekambaram, Bangalore (IN)

(73) Assignee: TRANE INTERNATIONAL INC., Davidson, NC (US)

( * ) Notice: Subject to any disclaimer, the term of this patent is extended or adjusted under 35 U.S.C. 154(b) by 124 days.

(21) Appl. No.: 17/139,762

(22) Filed: Dec. 31, 2020

(65) Prior Publication Data

US 2022/0205676 A1    Jun. 30, 2022

(51) Int. Cl.
*F24F 12/00* (2006.01)
*F24F 11/41* (2018.01)

(52) U.S. Cl.
CPC ............ *F24F 12/006* (2013.01); *F24F 11/41* (2018.01); *F24F 2012/007* (2013.01); *F24F 2203/104* (2013.01)

(58) Field of Classification Search
CPC .. F24F 12/001; F24F 12/006; F24F 2012/001; F24F 2012/006; F24F 2012/007; F24F 2203/104; F24F 11/41
See application file for complete search history.

(56) References Cited

U.S. PATENT DOCUMENTS 4,841,733 A * 6/1989 Dussault ............... F24F 12/001
                                                        165/223
5,193,610 A   3/1993 Morisette et al.
(Continued)

FOREIGN PATENT DOCUMENTS

| DE | 102018213274 A1 | 2/2020 |
| EP | 3557152 A1 | 10/2019 |
| WO | 2013/120600 A2 | 8/2013 |

OTHER PUBLICATIONS

Extended European Search Report; European Patent Application No. 21217751.3, dated May 19, 2022 (6 pages).

*Primary Examiner* — Marc E Norman
(74) *Attorney, Agent, or Firm* — Hamre, Schumann, Mueller & Larson, P.C.

(57) ABSTRACT

An air handler includes a housing with a heat exchanger core. The housing includes a faceplate, a roof panel, a base panel, a first side panel, and a second side panel. A first tunnel and a second tunnel are connected to the housing at the faceplate. A septum protrudes from the faceplate and connects the core at a front edge. The air handler further includes a first recirculation path and a second recirculation path inside the housing. The first and second recirculation paths are defined by the septum, the housing, and the core. The first and second recirculation paths are configured to direct a portion of airflow from the first tunnel to the second tunnel. The air handler further includes a first damper and a second damper disposed on the faceplate and configured to obstruct the first recirculation path and the second recirculation path respectively.

20 Claims, 10 Drawing Sheets

(56) References Cited

U.S. PATENT DOCUMENTS

| | | | |
|---|---|---|---|
| 5,497,823 A | 3/1996 | Davis | |
| 2003/0070787 A1* | 4/2003 | Moffitt | F24F 12/001 165/4 |
| 2007/0084586 A1* | 4/2007 | Poirier | F24F 12/006 165/97 |
| 2011/0264275 A1* | 10/2011 | Thomle | F24F 12/006 236/49.3 |
| 2012/0087086 A1* | 4/2012 | Kok | H05K 7/206 165/104.34 |
| 2019/0368769 A1 | 12/2019 | Hasegawa et al. | |
| 2020/0200413 A1* | 6/2020 | Horie | F24F 3/14 |

* cited by examiner

DAMPERS PLACED ON THE HALF FACE OF THE INLET AND THE OUTLET OF SIDE-BY-SIDE AIRFLOW ENERGY RECOVERY SECTIONS USED AS RECIRCULATION PATH

FIELD

This disclosure relates generally to an air handler with recirculation dampers for a heating, venting, air conditioning, and refrigeration (HVACR) system, particularly the arrangement, construction, and/or configuration of the recirculation dampers in the air handler.

BACKGROUND

A heat exchange assembly, such as an air handler with a heat exchanger core, can help mechanical ventilation of a controlled space be more cost-effective by reclaiming a portion of energy from vented indoor air before exhausting the vented indoor air into the environment. The vented indoor air and the fresh air exchange energy in the core and recapture a portion of the energy from the vented indoor air that would otherwise be lost if the vented indoor air were exhausted directly to the environment. The air handler can further reduce energy consumption by recirculating the vented indoor air into the controlled space while bypassing the core. The recirculation function can be achieved by recirculation dampers installed for the air handler.

SUMMARY

This disclosure relates generally to an air handler with recirculation dampers for a heating, venting, air conditioning, and refrigeration (HVACR) system, particularly the arrangement, construction, and/or configuration of recirculation dampers in the air handler.

By including dampers on a faceplate of an air handler housing instead of on a middle of unit wall shared by an indoor air inlet tunnel and an indoor air return tunnel connected to the air handler, flow of recirculation path within the air handler can be improved while saving space. By placing the dampers on the face of the air handler housing instead of the middle of unit wall, the tunnels connected to the air handler do not need to account for the size requirements of the damper. Accordingly, more compact recirculation flow paths can be used while still achieving sufficient flow and good pressure drop properties across the air handler.

According to an embodiment, an air handler for an HVACR system includes a housing. The housing includes a faceplate, a roof panel, a base panel, a first side panel, and a second side panel. A septum protrudes into the housing from a first side of the faceplate. A core is disposed within the housing and has a front edge connected to an edge of the septum, a top edge connected to the roof panel, a bottom edge connected to the base panel, a first side plate connected to the first side panel, and a second side plate connected to the second side panel. A first tunnel connects to a first area on the faceplate from a second side of the faceplate. The second side is opposite to the first side of the faceplate. A second tunnel connects to a second area of the faceplate from the second side. The second area is disjointed from the first area. A first recirculation path is defined by the faceplate, the roof panel, the septum, the first side panel, the second side panel, and the core. The first recirculation path is configured to channel a first portion of airflow from the first tunnel to the second tunnel. A second recirculation path is defined by the faceplate, the septum, the base panel, the first side panel, the second side panel, and the core. The second recirculation path is configured to channel a second portion of the airflow from the first tunnel to the second tunnel. A first damper is disposed in the first area of the faceplate and configured to obstruct the first recirculation path. A second damper is disposed in the second area of the faceplate and configured to obstruct the second recirculation path. A first opening is disposed in the first area of the faceplate and connecting the first tunnel to the second recirculation path. A second opening is disposed in the second area of the faceplate and connecting the second tunnel to the first recirculation path.

According to another embodiment, the second damper is disposed adjacent to the first side panel and the roof panel, and the first damper is disposed adjacent to the second side panel and the base panel.

According to yet another embodiment, the second opening is adjacent to the first side panel and the base panel, and the first opening is adjacent to the second side panel and the roof panel.

According to yet another embodiment, the first tunnel is an indoor air inlet from a controlled space, and the second tunnel is an indoor air return to the controlled space.

According to yet another embodiment, the core is a fixed plate heat exchanger or a rotary type wheel heat exchanger.

According to yet another embodiment, the core is in a horizontal configuration substantially parallel to the septum, and the fixed plate heat exchanger includes heat transfer plates that are in a vertical configuration when the core includes a fixed plate heat exchanger, and the rotary type wheel heat exchanger includes at least two side-by-side wheels when the core includes a rotary type wheel heat exchanger.

According to yet another embodiment, the first tunnel and the second tunnel are separated by a middle of unit wall that is substantially perpendicular to the faceplate on a first plane and substantially perpendicular to the septum on a second plane, wherein the second plane is substantially perpendicular to the first plane.

According to yet another embodiment, the first damper includes a plurality of sections that are configured to open or close independently among one another or in unison, and the second damper includes a plurality of sections that are configured to open or close independently among one another or in unison.

According to yet another embodiment, the first damper obstructs the first portion of the airflow from entering the first recirculation path when the first damper is in a closed position.

According to yet another embodiment, the second damper obstructs the second portion of the airflow from entering the second tunnel when the second damper is in a closed position.

According to yet another embodiment, the first portion of the airflow is recirculated to the second tunnel through the second opening when the first damper is in an open position, and the second portion of the airflow is recirculated to the second tunnel through the first opening and the second recirculation path when the second damper is in an open position.

According to yet another embodiment, the airflow entered the first tunnel from a controlled space is recirculated into the controlled space when the first and the second dampers are in their open positions.

According to yet another embodiment, the core further includes at least one of a bypass damper or a defrost damper.

According to one embodiment, a method of providing recirculation capabilities using an air handler with a core, includes opening a first damper and a second damper; receiving vented indoor air from a controlled space through a first tunnel; channeling a first portion of the vented indoor air from the first tunnel to a second tunnel through the first damper, a first recirculation path, and a second opening; channeling a second portion of the vented indoor air from the first tunnel to the second tunnel through a first opening, a second recirculation path, and the second damper; and returning the first portion of the vented indoor air and the second portion of the vented indoor air from the second tunnel into the controlled space. The air handler has a housing that includes a faceplate, a roof panel, a base panel, a first side panel, and a second side panel. The first recirculation path and the second recirculation path are separated by a septum protruding into the housing from a first side of the faceplate. The housing contains the core having a top edge connected to the roof panel, a bottom edge connected to the base panel, a front edge connected to the septum, a first side plate connected to the first side panel, and a second side plate connected to the second side panel. The first tunnel connects to the faceplate at a first area of a second side of the faceplate. The second side is opposite to the first side of the faceplate. The second tunnel connects to the faceplate at a second area of the first side of the faceplate. The second area is disjointed from the first area. The first damper and the first opening are disposed in the first area on the faceplate. The second damper and the second opening are disposed in the second area on the faceplate. The first recirculation path is defined by the roof panel, the faceplate, the first side panel, the second side panel, the septum, and the core. The second recirculation path is defined by the base panel, the faceplate, the first side panel, the second side panel, the septum, and the core.

According to another embodiment, the method further includes closing the first damper and the second damper; obstructing the vented indoor air in the first tunnel from entering into the first recirculation path; channeling the vented indoor air in the first tunnel into the second recirculation path through the first opening; channeling the vented indoor air in the second recirculation path into the core; channeling fresh air into the core; exchanging energy in the core between the vented indoor and the fresh air; channeling the fresh air in the core into the first recirculation path; obstructing the fresh air in the first recirculation path from entering into the first tunnel; channeling the fresh air in the first recirculation path into the second tunnel through the second opening; exhausting the vented indoor air from the core after exchanging energy; and channeling the fresh air from the second tunnel to the controlled space.

According to yet another embodiment, the second damper is disposed adjacent to the first side panel and the roof panel, and the first damper is disposed adjacent to the second side panel and the base panel, and the second opening is adjacent to the second side panel and the roof panel, and the first opening is adjacent to the first side panel and the base panel.

According to yet another embodiment, the first tunnel is an indoor air inlet from the controlled space, and the second tunnel is an indoor air return to the controlled space.

According to yet another embodiment, the core is a fixed plate heat exchanger or a rotary type wheel heat exchanger.

According to yet another embodiment, the core is in a horizontal configuration substantially parallel to the septum, and the fixed plate heat exchanger includes heat transfer plates that are in a vertical configuration when the core includes a fixed plate heat exchanger, and the rotary type wheel heat exchanger includes at least two side-by-side wheels.

According to yet another embodiment, the first tunnel and the second tunnel are separated by a middle of unit wall that is substantially perpendicular to the faceplate on a first plane and substantially perpendicular to the septum on a second plane, wherein the second plane is substantially perpendicular to the first plane.

According to yet another embodiment, the first damper includes a plurality of sections that are configured to open or close independently among one another or in unison, and the second damper includes a plurality of sections that are configured to open or close independently among one another or in unison.

According to yet another embodiment, the core is a counter flow air to air heat exchanger.

According to yet another embodiment, the core is a rotary type wheel heat exchanger. For example, the core can be at least two side-by-side energy wheels ("EW"), cool-dry-quiet ("CDQ") desiccant wheels, or dehumidification wheels.

BRIEF DESCRIPTION OF THE DRAWINGS

References are made to the accompanying drawings that form a part of this disclosure, and which illustrate embodiments in which the systems and methods described herein can be practiced.

Like reference numbers represent like parts throughout.

DETAILED DESCRIPTION

This disclosure relates generally to an air handler with recirculation dampers for a heating, venting, air conditioning, and refrigeration (HVACR) system, particularly the arrangement, construction, and/or configuration of the recirculation dampers in the air handler.

Figure 1A:
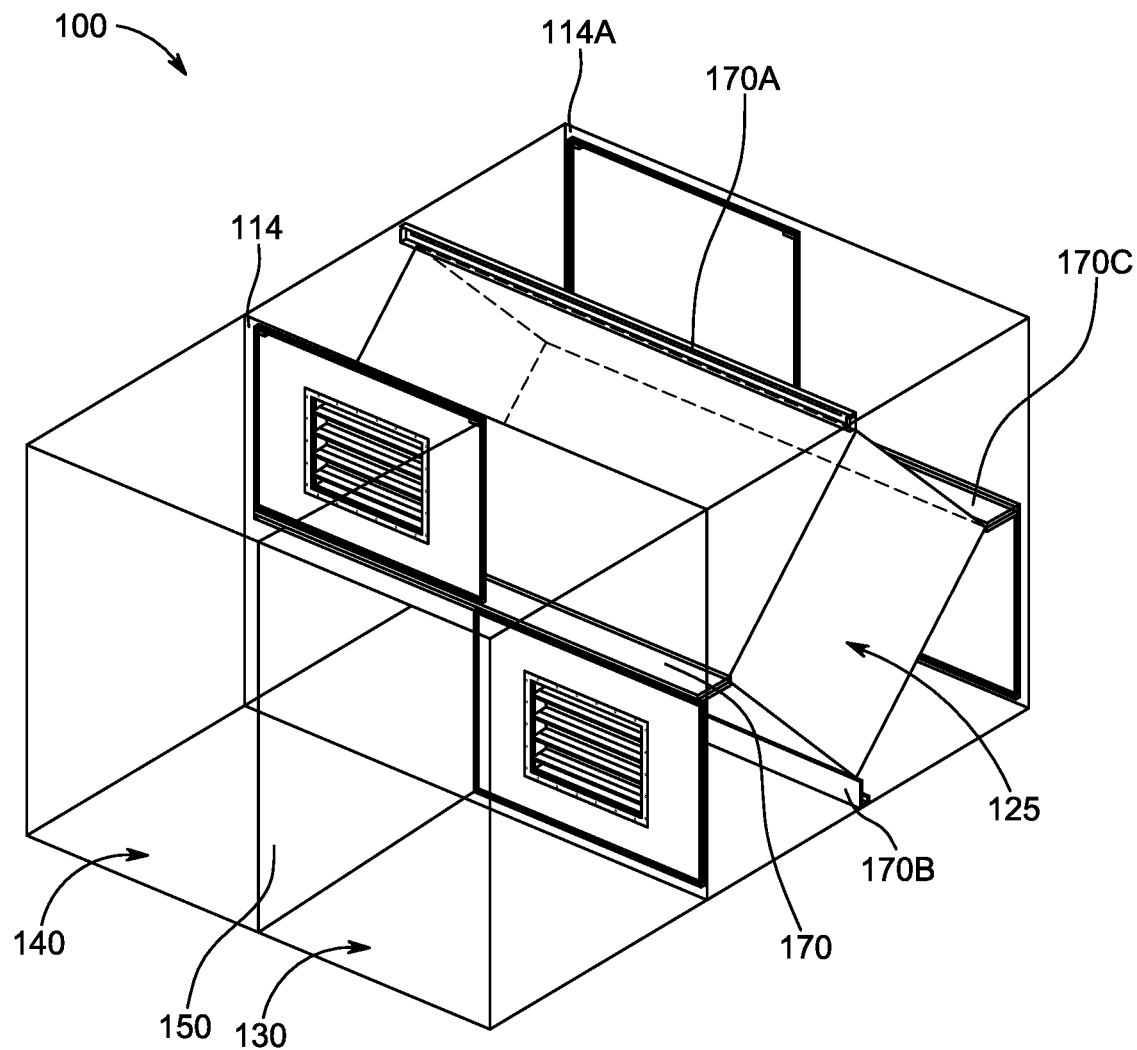
FIG. 1A is a perspective view of an air handler with recirculation capabilities according to one embodiment.

FIG. 1A is a perspective view of an air handler 100 with recirculation capabilities, according to one embodiment. As shown in FIG. 1A, air handler 100 includes a housing and a heat exchanger core 125.

Figure 1B:
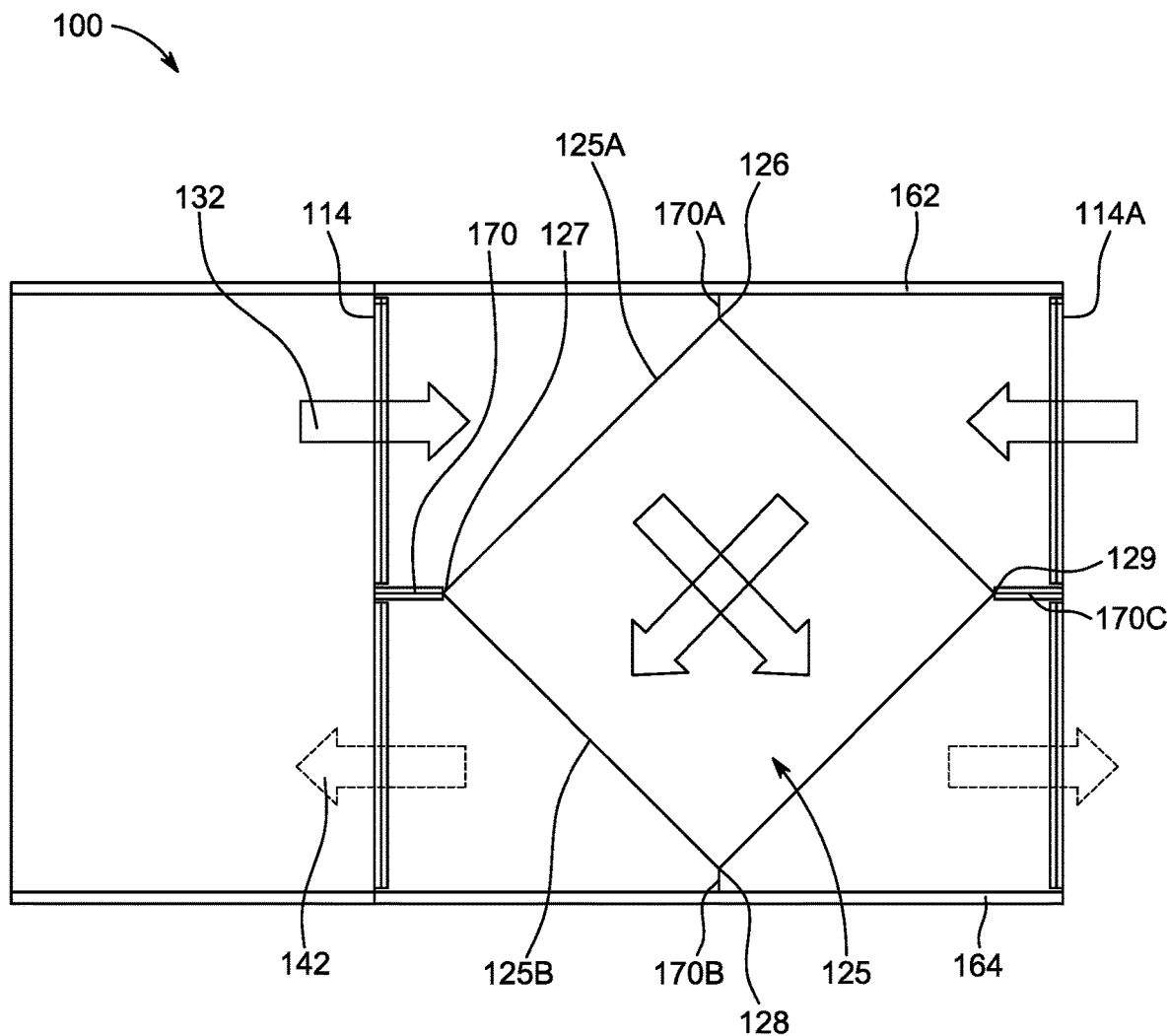
FIG. 1B is a side view of the air handler in a ventilating mode according to the embodiment of FIG. 1A.
Figure 1C:
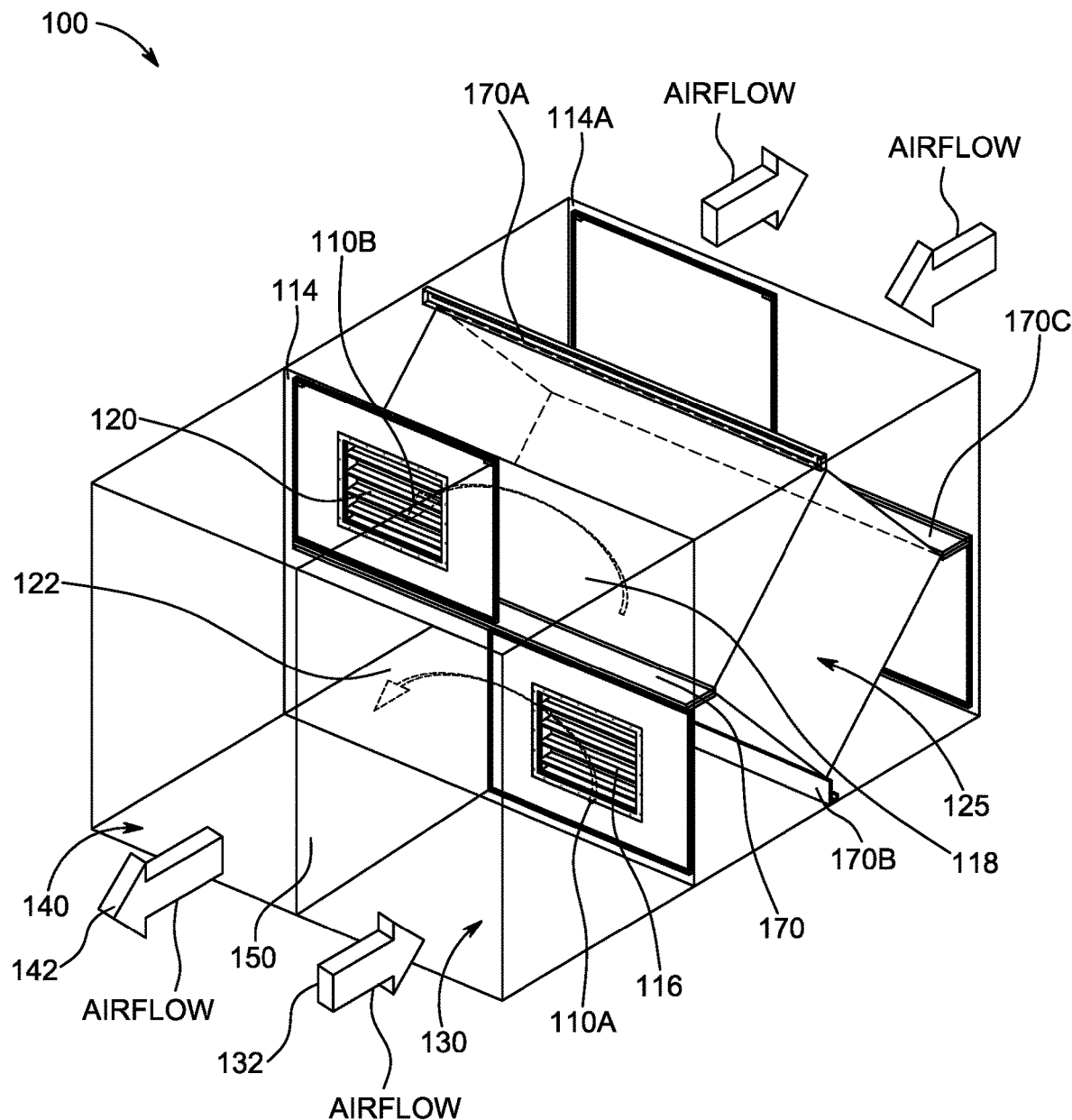
FIG. 1C is a perspective view of the air handler in a recirculation mode according to the embodiment of FIG. 1A.
Figure 1D:
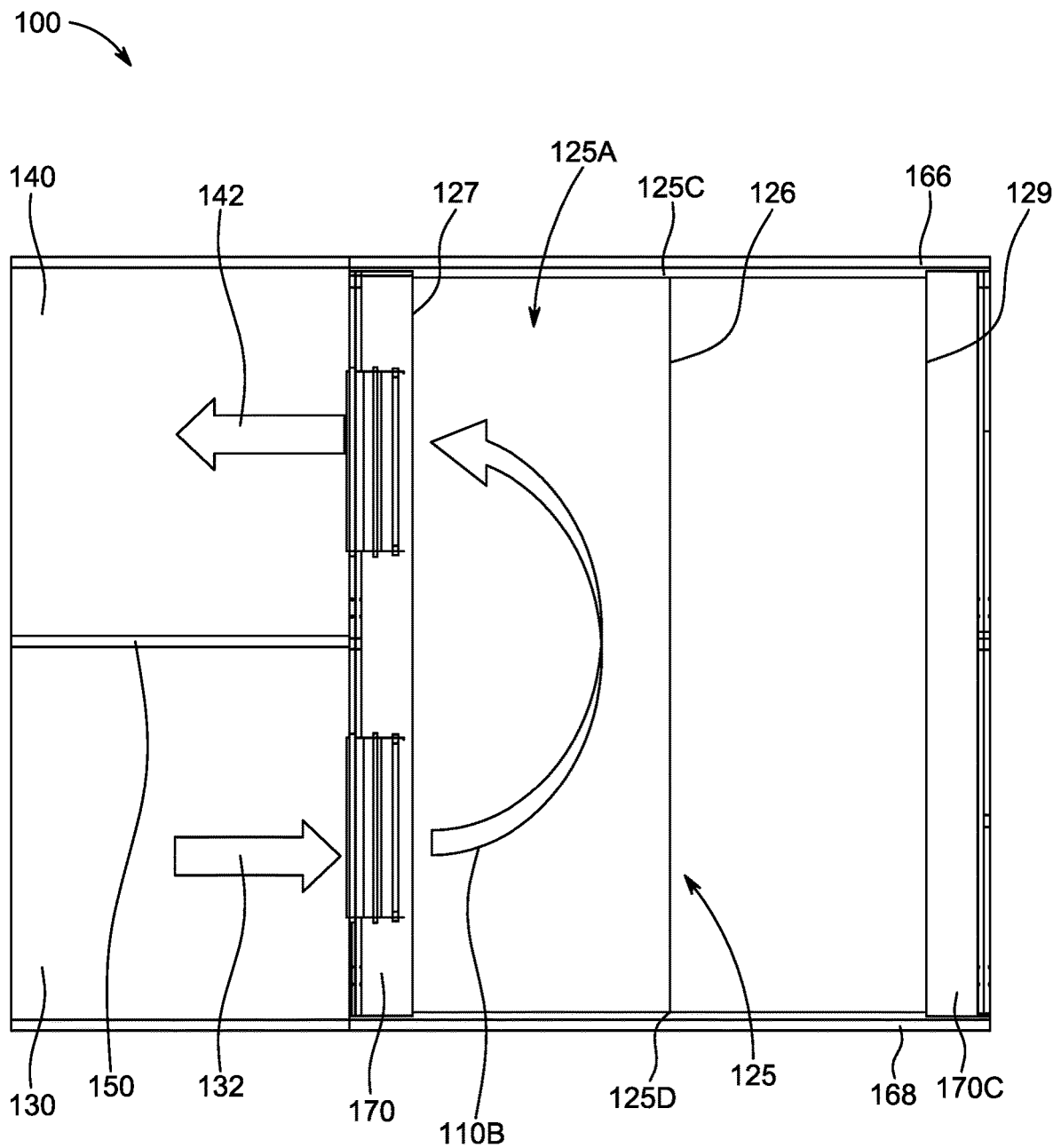
FIG. 1D is a top view of the air handler in a recirculation mode according to the embodiment of FIG. 1A.

The housing includes the faceplate 114, a rear faceplate 114A, a roof panel 162 (shown in FIG. 1B), a base panel 164 (shown in FIG. 1B), a first side panel 166 (shown in FIG. 1D), and a second side panel 168 (shown in FIG. 1D). According to an embodiment, the air handler 100 further includes a septum 170, or alternatively referred to as a septum panel 170, protruding from a first side of the faceplate 114. The septum 170 extends from the first side panel 166 on one end of the septum 170, to the second side panel 168 on the other end of the septum 170. The septum 170 is joined to the faceplate 114 on one side of the septum 170, and to the core 125 on the other side of the septum 170.

The heat exchanger core 125 can alternatively be referred to as the core 125 or an energy recovery section 125. The housing connects to a first tunnel 130 and a second tunnel 140 at a faceplate 114 of the air handler 100.

FIG. 1B is a side view of the air handler 100 in a ventilating mode, according to the embodiment of FIG. 1A. As shown in FIG. 1B, the air handler 100 further includes at least one of a top block-off 170A, a bottom block-off 170B, or a rear septum 170C, according to an embodiment. The core 125 is disposed inside the housing. The core 125 includes a top edge 126, a bottom edge 128, a front edge 127, and a back edge 129. The top block-off 170A connects the top edge 126 to the roof panel 162. The bottom block-off 170B connects a bottom edge 128 to the base panel 164. The septum 170 connects the front edge 127 to the faceplate 114. The rear septum 170C connects the back edge 129 to the rear faceplate 114A.

FIG. 1C is a perspective view of the air handler 100 in a recirculation mode, according to the embodiment of FIG. 1A. As shown in FIG. 1C, the first tunnel 130 connects to a second side of the faceplate 114 at a first area. The second side of the faceplate 114 is opposite to the first side of the faceplate 114 where the septum 170 protrudes from. The first tunnel 130 introduces vented indoor air into the housing. The vented indoor air can be indoor air removed from a controlled space and before the indoor air is exhausted to the outside environment. The controlled space is served by an HVACR system, and the controlled space can be a room, an office, a building, or the like. According to an embodiment, the vented indoor air from the controlled space is heated or cooled to a desired temperature that is generally different from the temperature of untreated fresh air from the outside environment. Without a core in the air handler, the vented indoor is exhausted into the environment, and nearly all the energy consumed to heat or cool the vented air would have been lost.

The second tunnel 140 connects to the faceplate 114 on the second side of the faceplate 114. The second side of the faceplate 114 is the same side of the faceplate 114 where the first tunnel 130 also connects to the faceplate 114. The second tunnel 140 connects to the second side at a second area that is disjointed from the first area connected to the first tunnel 130. According to an embodiment, the first area and the second area are adjacent to but separated from each other at where a middle of unit wall 150 connects to the faceplate 114

A first damper 116 is disposed on the faceplate 114 within the first area. The first damper 116 connects a portion of the first tunnel 130 to a first recirculation path 110A. A first opening 118 is disposed on the faceplate 114 within the first area. The first opening 118 connects another portion of the first tunnel 130 to a second recirculation path 110B. A second damper 120 is disposed on faceplate 114 within the second area. The second damper 120 connects a portion of the second tunnel 140 to the second recirculation path 110B.

A second opening 122 is disposed on the faceplate 114 within the second area. The second opening 122 connects another portion of the second tunnel 140 to the first recirculation path 110A.

According to one embodiment, the first damper 116 is disposed on a lower portion of the faceplate 114 below the septum 170. The second opening 122 is disposed on the lower portion of the faceplate 114 below the septum 170. The second damper 120 is disposed on an upper portion of the faceplate 114 below the septum 170. The first opening 118 is disposed on the upper portion of the faceplate 114 below the septum 170.

According to another embodiment, the first damper 116 occupies approximately one half of the first area on the faceplate 114. The first opening 118 occupies approximately the other half of the first area. The second damper 120 occupies approximately one half of the second area on the faceplate 114. The second opening 122 occupied approximately the other half of the second area. Further, the first damper 116, the first opening 118, the second damper 120, and the second opening 122 each occupies a portion of the faceplate 114 that are disjointed from one another.

The first tunnel 130 conducts the vented indoor air into the air handler 100 via the first damper 116 and the first opening 118. Accordingly, the first tunnel 130 functions as an indoor air intake 132. The second tunnel 140 conducts air from the air handler 100 to the controlled space via the second damper 120 and the second opening 122. Accordingly, the second tunnel 140 functions as an indoor air return 142. The first tunnel 130 and the second tunnel 140 are separated by a middle of unit wall 150. In an embodiment, the middle of unit walls 150 is substantially perpendicular to the faceplate 114 on a first plane and substantially perpendicular to the septum 170 on a second plane. Further, the second plane is substantially perpendicular to the first plane.

FIG. 1D is a top view of the air handler 100 in a recirculation mode, according to the embodiment of FIG. 1A. As shown in FIGS. 1B and 1D, the core 125 within the air handler 100 has a top edge 126, a front edge 127, a bottom edge 128, and a back edge 129. The core 125 connects to the septum 170 at the front edge 127. A top surface 125A of the core 125 is located between the top edge 126 and the front edge 127, and a bottom surface 125B of the core 125 is located between the bottom edge 128 and the front edge 127. The core 125 further includes a first side plate 125C connected to the first side panel 166 of the air handler 100 and a second side plate 125D connected to the second side panel 168 of air handler 100. According to one embodiment, the core 125 is disposed in a horizontal configuration with heat exchanger plates (not shown) of the core 125 in a vertical configuration. According to one embodiment, the core 125 is in a horizontal configuration when the top edge 126, the front edge 127, the bottom edge 128, or the back edge 129 is perpendicular to the middle of unit wall 150 that separates the first tunnel 130 and the second tunnel 140.

The second recirculation path 110B of the air handler 100 is defined by the roof panel 162, the faceplate 114, the septum 170, the first side panel 166, the second side panel 168, and the core 125. The first recirculation path 110A of the air handler 100 is defined by the base panel 165, the faceplate 114, the septum 170, the first side panel 166, the second side panel 168, and the core 125. The first recirculation path 110A and the second recirculation path 110B are inside the housing and are separated by the septum 170.

According to one embodiment, the second recirculation path 110B of the air handler 100 is defined by the roof panel 162, the faceplate 114, the septum 170, the first side panel 166, the second side panel 168, and the top surface 125A. The first recirculation path 110A of the air handler 100 is defined by the base panel 164, the faceplate 114, the septum 170, the first side panel 166, the second side panel 168, and the bottom surface 125B.

As shown in FIGS. 1B and 1C, the air handler can 100 be in a circulation mode or a ventilation mode. In the ventilation mode, the first damper 116 is in a closed position, the first damper 116 obstructs the vented indoor air from the indoor air intake 132 entering the first recirculation path 110A and further obstructs the vented indoor air from entering the second tunnel 140 downstream from the first damper 116. When the second damper 120 is in a closed position, vented indoor air from the indoor air intake 132 is allowed into to pass through the first opening 118, but the second damper 120 obstructs the vented indoor air in the second recirculation path 110B from entering the second tunnel 140. Accordingly, the indoor air from the indoor air intake 142 is obstructed from recirculating into the controlled space through the second tunnel 140 as the indoor air return 142. Accordingly, when the first and the second dampers 116 and 120 are both in their closed positions, vented indoor air entered into the first tunnel 130 is primarily exhausted after exchanging heat in the core 125.

In the recirculation mode, the first damper 116 is in an open position, a first portion of the vented indoor air from the indoor air intake 132 can flow through the first damper 116 into the first recirculation path 110A. The first portion of the vented indoor air in the first recirculation path 110A can further enter into the second tunnel 140 through the second opening 122 as a portion of the indoor air return 142. Accordingly, when the first damper 116 is in the open position, the first portion of the vented indoor air from the indoor air intake 132 is recirculated through the first recirculation path 110A into the second tunnel 140 as a portion of the indoor air return 142. The vented indoor air from the indoor air intake 132 is recirculated back to the controlled space.

In the recirculation mode, the second damper 120 is in an open position. A second portion of the vented indoor air from the indoor air intake 132 can flow through the first opening 118 into the second recirculation path 110B. The second portion of the vented indoor air in the second recirculation path 110B can further flow through the opened second damper 120 into the second tunnel 140 as another portion of the indoor air return 142. Accordingly, when the second damper 120 is in the open position, the second portion of the vented indoor air from the indoor air intake 132 is recirculated through the second recirculation path 110B into the second tunnel 140 as another portion of the indoor air return 142. The indoor air from the indoor air intake 132 is recirculated back to the controlled space. Further, when the first damper 116 and the second damper 120 are both in their open positions, a portion of the indoor air from the first tunnel 130 is recirculated through the second tunnel 140 and back into the controlled space.

It is appreciated that, although the first damper 116 and the second damper 120 are depicted to have horizontal blades with linkages operated with rotary actuators, the dampers 116 and 120 are no limited to his configuration. According to one embodiment, the dampers 116 and 120 can be vertical blade type dampers. The blades on each of the recirculation dampers parallel blade configuration or an opposed blade configuration, or a combination of both. According to another embodiment, the dampers 116 and 120 can be any type of damper that obstruct airflow. It is also appreciated that, when the first damper 116 includes a plurality of sections, each of the sections can be operated independently from one another or in unison. When the second damper 120 includes a plurality of sections, each of the sections can be operated independently from one another or in unison. It is appreciated that the first damper 116 and the second damper 120 can be operated independently or in unison.

In the ventilation mode, energy is recovered in the core 125. The first damper 116 is in the closed position and obstructs the vented indoor air in the first tunnel 130 from entering into the first recirculation path 110A. The vented indoor air flows into the second recirculation path 110B through the first opening 118. The second damper 118 is in the closed position and obstructs the vented indoor in the second recirculation oath 110B from entering the second tunnel 140. Accordingly, the vented indoor air enters into the core 125. Fresh air from the environment enters the core 125 through the rear faceplate 114A and exchanges energy with the vented indoor air in the core 125. After passing the core 125, the fresh air enters into the first recirculation path 110A. The fresh air is obstructed by the first damper 116 and channeled into the second tunnel 140 through the second opening 122. The fresh air in the second tunnel 140 becomes the indoor air return 142 and is further channeled into the controlled space. The vented indoor air is exhausted into the environment after passing the core 125.

Figure 2A:
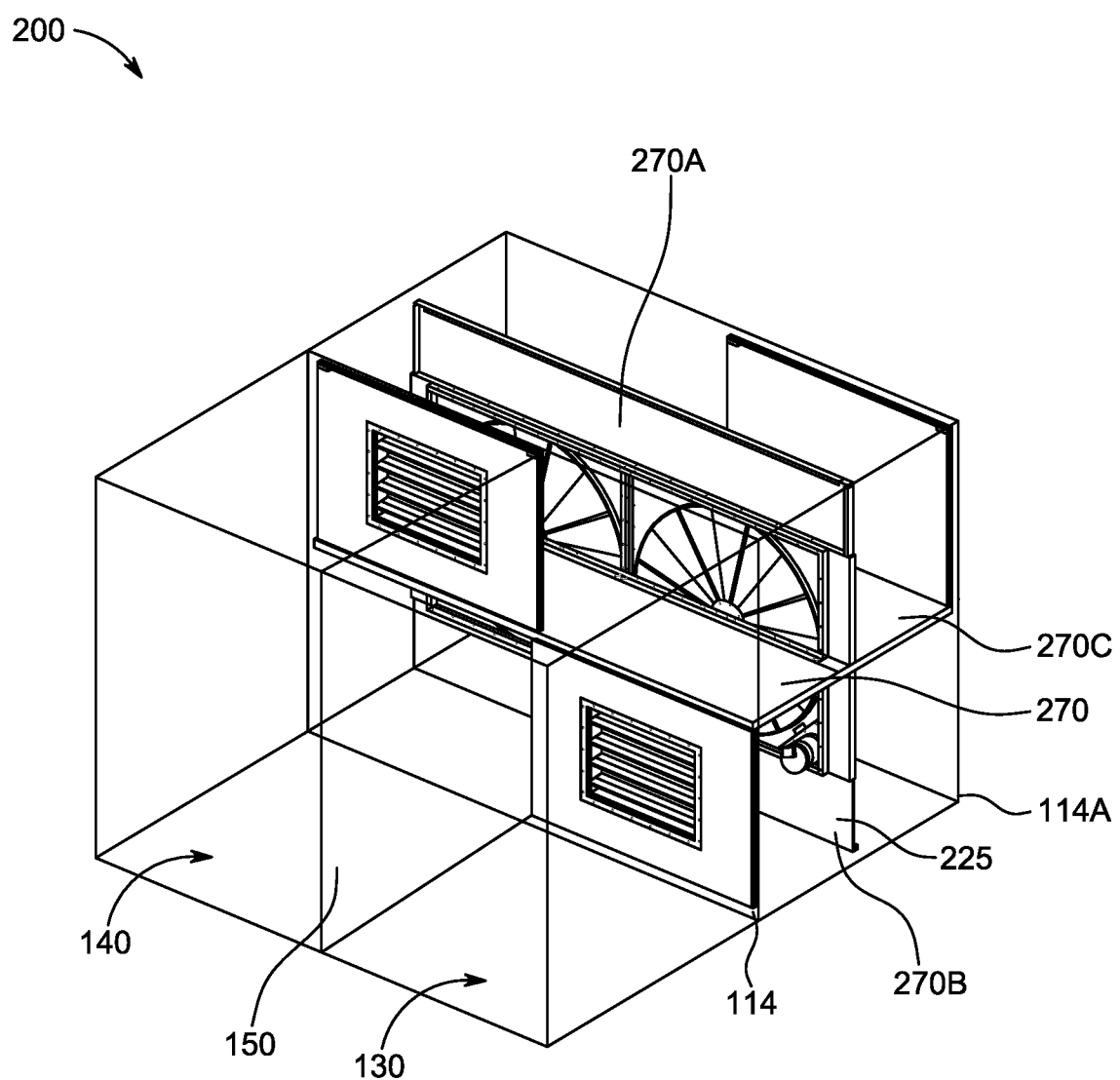
FIG. 2A is a perspective view of an air handler with recirculation capabilities according to another embodiment.

FIG. 2A is a perspective view of an air handler 200 with recirculation capabilities, according to another embodiment. As shown in FIG. 2A, air handler 200 includes a housing and a heat exchanger core 225.

Figure 2B:
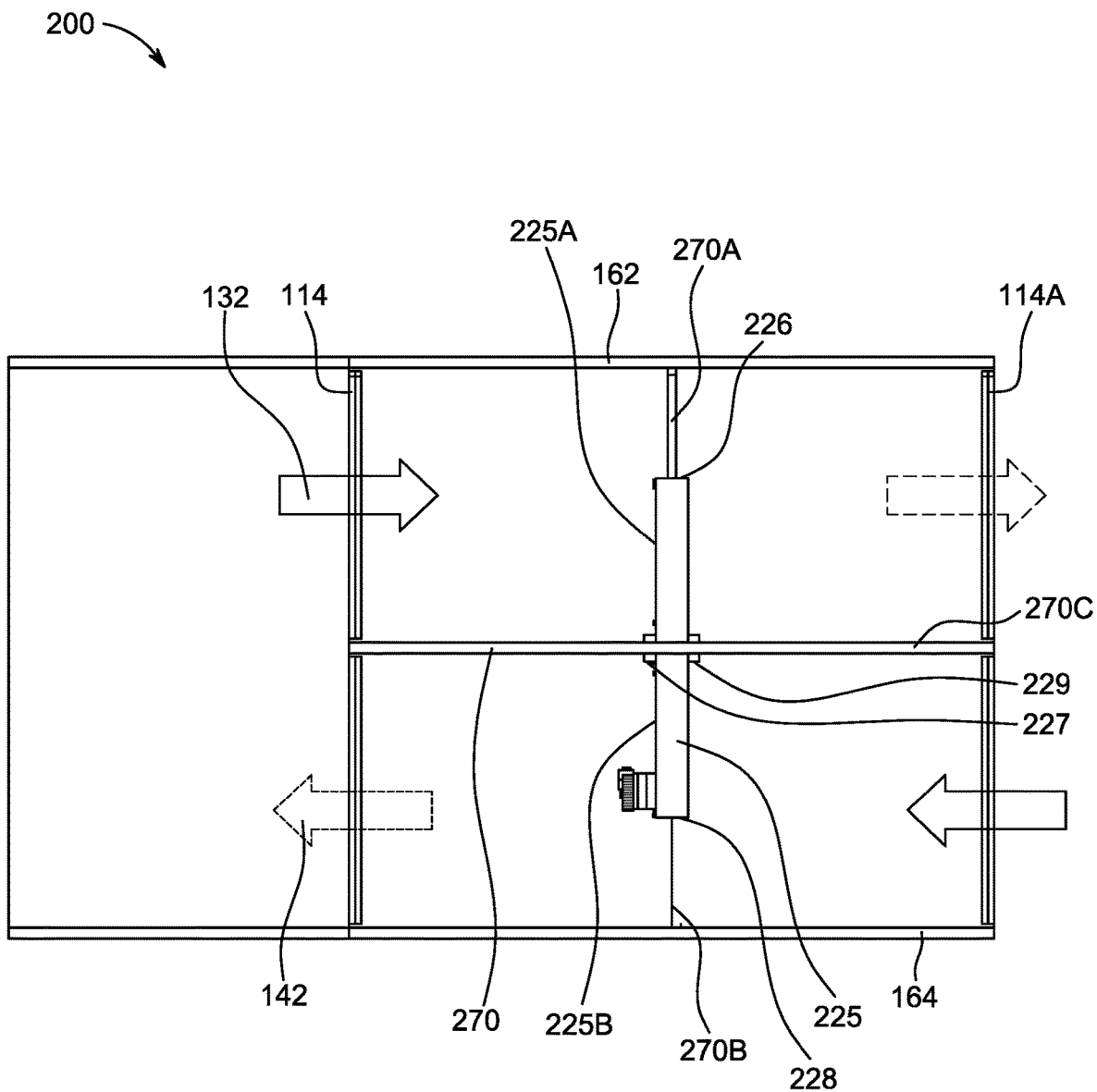
FIG. 2B is a side view of the air handler in a ventilating mode according to the embodiment of FIG. 2A.
Figure 2C:
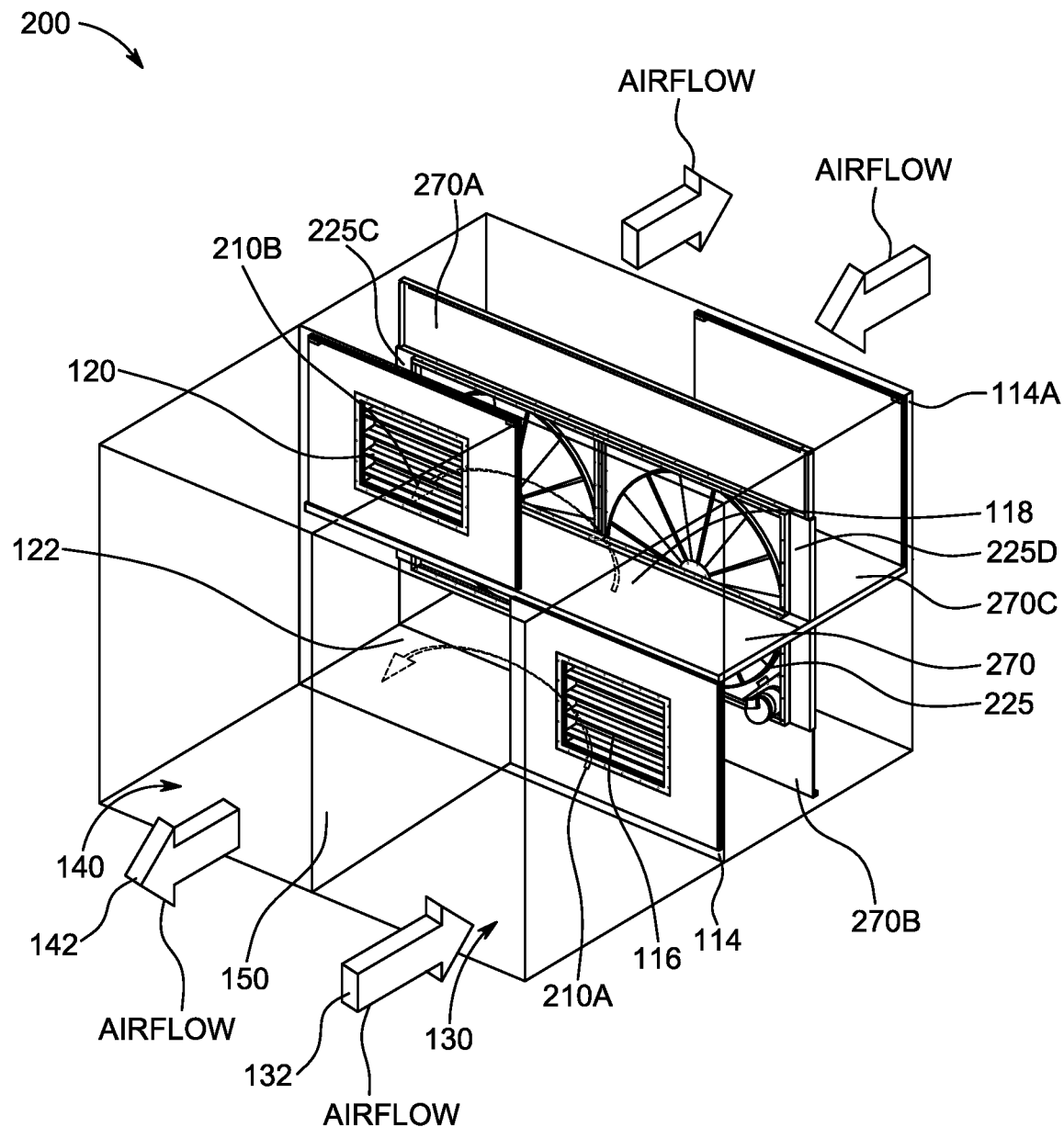
FIG. 2C is a perspective view of the air handler in a recirculation mode according to the embodiment of FIG. 2A.
Figure 2D:
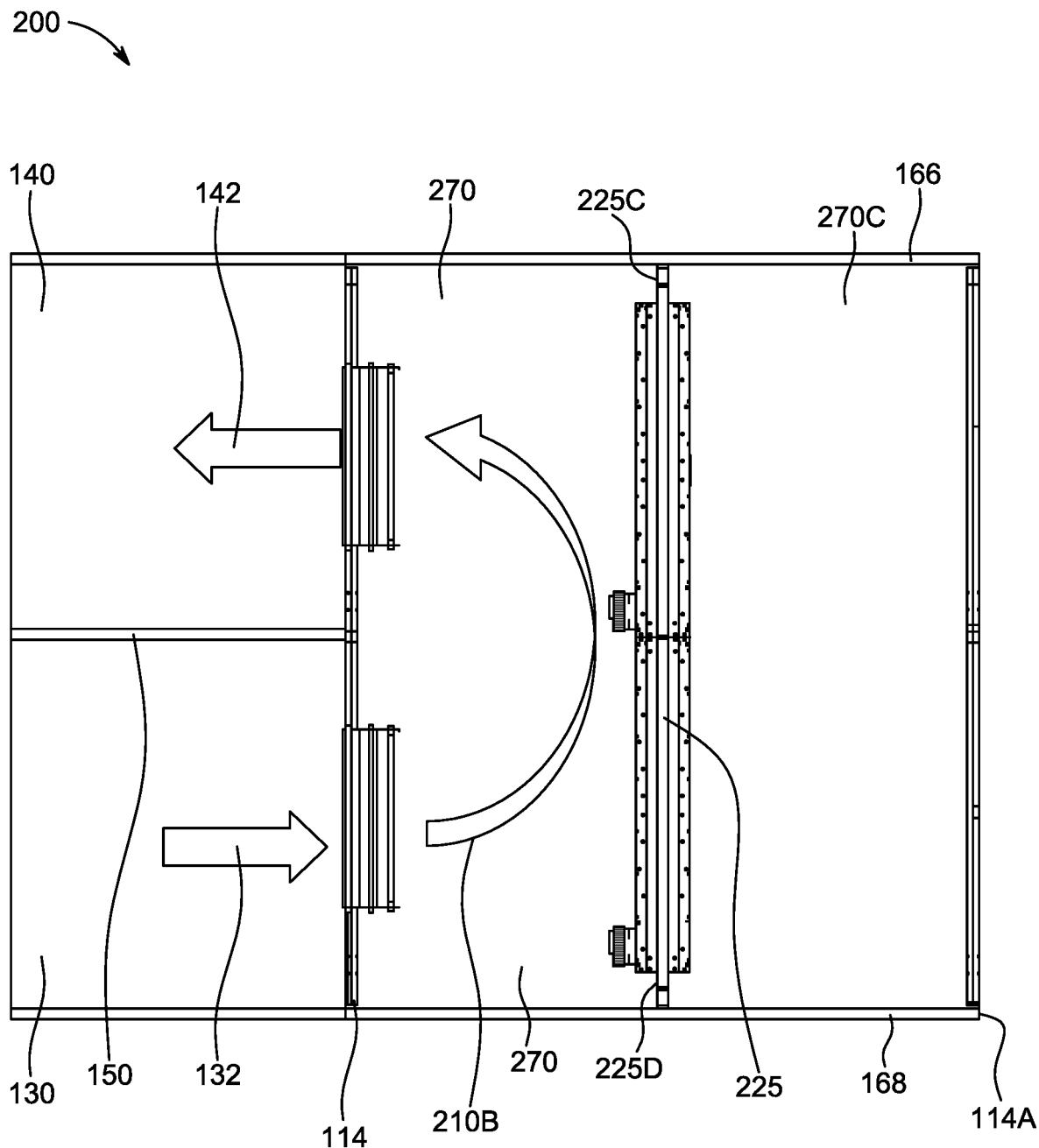
FIG. 2D is a top view of the air handler in a recirculation mode according to the embodiment of FIG. 2A.

The housing includes the faceplate 114, a rear faceplate 114A, a roof panel 162 (shown in FIG. 2B), a base panel 164 (shown in FIG. 2B), a first side panel 166 (shown in FIG. 2D), and a second side panel 168 (shown in FIG. 2D). According to an embodiment, the air handler 200 further includes a septum 270, or a septum panel 270, protruding from a first side of the faceplate 114. The septum 270 connects to the first side panel 166 on one end of the septum 270, to the second side panel 168 on the other end of the septum 270, to the faceplate 114 on one side of the septum 270, and to the core 225 on the other side of the septum 270.

The heat exchanger core 225 can be alternatively referred to as the core 225 or an energy recovery section 225. The housing connects to a first tunnel 130 and a second tunnel 140 at a faceplate 114 of the air handler 200.

FIG. 2B is a side view of the air handler 200 in a ventilating mode, according to the embodiment of FIG. 2A. As shown in FIG. 2B, the air handler 200 further includes at least one of a top block-off 270A, a bottom block-off 270B, or a rear septum 270C, according to an embodiment. The core 225 is disposed inside the housing. The core 225 includes a top edge 226 or a top surface 226, a bottom edge 228 or a bottom surface 228, a front edge 227 or a front surface 227, and a back edge 229 or a back surface 229. The top block-off 270A connects the top edge 226 to the roof panel 162. The bottom block-off 270B connects a bottom edge 228 to the base panel 164. The septum 270 connects the front edge 227 to the faceplate 114. The rear septum 270C connects the back edge 229 to the rear faceplate 114A.

FIG. 2C is a perspective view of the air handler 200 in a recirculation mode, according to the embodiment of FIG. 2A. As shown in FIG. 2C, the first tunnel 230 connects to a second side of the faceplate 114 at a first area. The second side of the faceplate 114 is opposite to the first side of the faceplate 114 where the septum 270 protrudes from. According to one embodiment, the first tunnel 130 introduces vented indoor air into the housing. The vented indoor air is indoor air removed from a controlled space and before the indoor air is exhausted to the outside environment. The controlled space is served by an HVACR system, and the controlled space can be a room, an office, a building, or the likes. According to an embodiment, the vented indoor air from the controlled space is heated or cooled to a desired temperature that is generally different from the temperature of untreated fresh air from the outside environment. Without a core in the air handler, the vented indoor is exhausted into the environment, and nearly all the energy consumed to heat or cool the vented air would have been lost.

The second tunnel 140 connects to the faceplate 114 on the second side of the faceplate 114. The second side of the faceplate 114 is the same side of the faceplate 114 where the first tunnel 130 also connects to the faceplate 114. The second tunnel 140 connects to the second side at a second area that is disjointed from the first area connected to the first tunnel 130. According to an embodiment, the first area and the second area are adjacent to and disjointed from each other at where a middle of unit wall 150 connects to the faceplate 114.

A first damper 116 is disposed on the faceplate 114 within the first area. The first damper 116 connects a portion of the first tunnel 130 to a first recirculation path 210A. A first opening 118 is disposed on the faceplate 114 within the first area. The first opening 118 connects another portion of the first tunnel 130 to a second recirculation path 210B. A second damper 120 is disposed on faceplate 114 within the second area. The second damper 120 connects a portion of the second tunnel 140 to the second recirculation path 210B. A second opening 122 is disposed on the faceplate 114 within the second area. The second opening 122 connects another portion of the second tunnel 140 to the first recirculation path 210A.

According to one embodiment, the first damper 116 is disposed on a lower portion of the faceplate 114 below the septum 270. The second opening 122 is disposed on the lower portion of the faceplate 114 below the septum 270. The second damper 120 is disposed on an upper portion of the faceplate 114 above the septum 270. The first opening 118 is disposed on the upper portion of the faceplate 114 above the septum 270.

According to another embodiment, the first damper 116 occupies approximately one half of the first area on the faceplate 114. The first opening 118 occupies approximately the other half of the first area. The second damper 120 occupies approximately one half of the second area on the faceplate 114. The second opening 122 occupied approximately the other half of the second area. Further, the first damper 116, the first opening 118, the second damper 120, and the second opening 122 each occupies a portion of the faceplate 114 that are disjointed from one another.

The first tunnel 130 conducts the vented indoor air into the air handler 200 via the first damper 116 and the first opening 118. Accordingly, the first tunnel 130 functions as an indoor air intake 132. The second tunnel 140 conducts air from the air handler 100 to the controlled space via the second damper 120 and the second opening 122. Accordingly, the second tunnel 140 functions as an indoor air return 142. The first tunnel 130 and the second tunnel 140 are separated by the middle of unit wall 150. According to an embodiment, the middle of unit wall 150 is substantially perpendicular to the faceplate 114 on a first plane and substantially perpendicular to the septum 270 on a second plane. Further, the second plane is substantially perpendicular to the first plane.

FIG. 1D is a top view of the air handler 200 in a recirculation mode, according to the embodiment of FIG. 2A. As shown in FIGS. 2B and 2D, the core 225 within the air handler 200 has a top edge 226, a front edge 227, a bottom edge 228, and a back edge 229. The core 225 connects to the septum 270 at the front edge 227. A top surface 225A of the core 225 is located between the top edge 226 and the front edge 227, and a bottom surface 225B of the core 225 is located between the bottom edge 228 and the front edge 227. The core 225 further includes a first side plate 225C connected to the first side panel 166 of the air handler 200 and a second side plate 225D connected to the second side panel 168 of the air handler 200. According to one embodiment, the core 225 is disposed in a side-by-side dual wheel configuration with heat exchanger wheels of the core 225 configured to rotate in the same vertical plane substantially parallel to the faceplate 114, and the centers of rotation of both heat exchanger wheels are in a line substantially overlaps the intersection of the vertical plane of the rotating dual-wheels and the septum 270. According to one embodiment, the core 225 includes at least three side-by-side heat exchanger wheels.

The second recirculation path 210B (shown in FIG. 2C) of the air handler 200 is defined by the roof panel 162, the faceplate 114, the septum 270, the first side panel 166, the second side panel 168, and the core 225. The first recirculation path 210A (shown in FIG. 2C) of the air handler 200 is defined by the base panel 165, the faceplate 114, the septum 270, the first side panel 166, the second side panel 168, and the core 225. The first recirculation path 210A and the second recirculation path 210B are inside the housing and are separated by the septum 270.

According to one embodiment, the second recirculation path 210B of the air handler 200 is defined by the roof panel 162, the faceplate 114, the septum 270, the first side panel 166, the second side panel 168, and the top surface 225A. The first recirculation path 210A of the air handler 100 is defined by the base panel 164, the faceplate 114, the septum 170, the first side panel 166, the second side panel 168, and the bottom surface 225B. According to another embodiment where at least one of the first side plate 225C, the second side plate 225D, the top block-off 170A, or the bottom block-off 170A is included in the air handler 200. The second recirculation path 210B is further defined the at least one of the first side plate 225C, the second side plate 225D, the top block-off 170A included in the air handler 200. The first recirculation path 210A is further defined the at least one of the first side plate 225C, the second side plate 225D, the bottom block-off 170B included in the air handler 200.

As shown in FIGS. 2B and 2C, the air handler 200 can be in a circulation mode or a ventilation mode. In the ventilation mode, the first damper 116 is in a closed position, the first damper 116 obstructs the vented indoor air from the indoor air intake 132 entering the first recirculation path 210A and further obstructs the vented indoor air from entering the second tunnel 140 downstream from the first damper 116 via the first recirculation path 210A. When the second damper 120 is in a closed position, vented indoor air from the indoor air intake 132 is allowed into the second recirculation path 210B through the first opening 118, but the second damper 120 obstructs the vented indoor air in the second recirculation path 210B from entering the second tunnel 140. Accordingly, the indoor air from the indoor air intake 142 is obstructed from recirculating into the controlled space through the second tunnel 140 as the indoor air return 142. Accordingly, when the first and the second dampers 116 and 120 are both in their closed positions, vented indoor air entered into the first tunnel 130 is primarily exhausted after exchanging heat in the core 225.

In the recirculation mode, the first damper 116 is in an open position. A first portion of the vented indoor air from the indoor air intake 132 can flow through the first damper 116 into the first recirculation path 210A. The first portion of the vented indoor air in the first recirculation path 210A can further enter into the second tunnel 140 through the second opening 122 as a portion of the indoor air return 142. Accordingly, when the first damper 116 is in the open position, the first portion of the vented indoor air from the indoor air intake 132 is recirculated through the first recirculation path 210A into the second tunnel 140 as a portion of the indoor air return 142. The vented indoor air from the indoor air intake 132 is recirculated back to the controlled space.

In the recirculation mode, the second damper 120 is in an open position. A second portion of the vented indoor air from the indoor air intake 132 can flow through the first opening 118 into the second recirculation path 210B. The second portion of the vented indoor air in the second recirculation path 210B can further flow through the opened second damper 120 into the second tunnel 140 as another portion of the indoor air return 142. Accordingly, when the second damper 120 is in the open position, the second portion of the vented indoor air from the indoor air intake 132 is recirculated through the second recirculation path 210B into the second tunnel 140 as another portion of the indoor air return 142. The indoor air from the indoor air intake 132 is recirculated back to the controlled space. Accordingly, when the first damper 116 and the second damper 120 are both in their open positions, at least a portion of the indoor air from the first tunnel 130 is recirculated through the second tunnel 140 and back into the controlled space.

It is appreciated that, although the first damper 116 and the second damper 120 are depicted to have horizontal blades with linkages operated with rotary actuators, the dampers 116 and 120 are not limited this configuration. According to an embodiment, the dampers 116 and 120 can be vertical blade type dampers. The blades on each of the dampers can be a parallel blade configuration or an opposed blade configuration, or a combination of both. According to another embodiment, the dampers 116 and 120 can be any type of damper that obstruct airflow.

In the ventilation mode, energy is recovered in the core 225. The first damper 116 is in the closed position and obstructs the vented indoor air in the first tunnel 130 from entering into the first recirculation path 210A. The vented indoor air flows into the second recirculation path 210B through the first opening 118. The second damper 118 is in the closed position and obstructs the vented indoor in the second recirculation oath 210B from entering the second tunnel 140. Accordingly, the vented indoor air enters into the core 225. Fresh air from the environment enters the core 225 through the rear faceplate 114A and exchanges energy with the vented indoor air in the core 225. After passing the core 225, the fresh air enters into the first recirculation path 210A. The fresh air is obstructed by the first damper 116 and channeled into the second tunnel 140 through the second opening 122. The fresh air in the second tunnel 140 becomes the indoor air return 142 and is further channeled into the controlled space. The vented indoor air is exhausted into the environment after passing the core 225.

According to another embodiment, the core 125 or 225 further includes at least one of a defrost damper or a bypass damper (not shown). The defrost damper, when opened, introduces heated air or indoor air to the heat exchanger in the core 125 or 225, and removes frost on the heat exchanger by warming the heat exchanger with the heated air. The bypass damper, when opened, conducts vented indoor air to the exhaust without passing through the core 125 or 225.

Figure 3A:
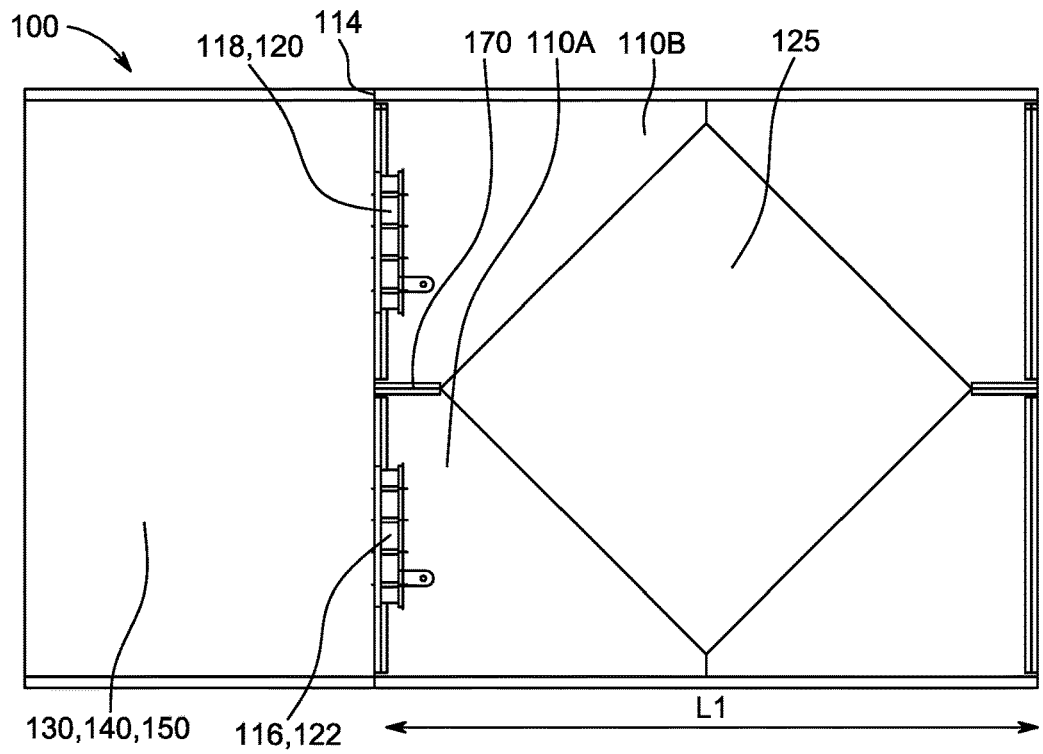
FIG. 3A is a side view of the air handler according to the embodiment of FIG. 1A, to illustrate space savings.

FIG. 3A is a side view of the air handler to illustrate space savings. As shown in FIG. 3A, the air handler 100 includes the core 125, the first recirculation path 110A, and the second recirculation path 110B. The first tunnel 130 connects to the air handler 100 at the first area of the faceplate 114. A septum 170 connects the core 125 to the faceplate 114. The second tunnel 140 connects to the air handler 100 at the second area of the faceplate 114. The first tunnel 130 and the second tunnel 140 are separated by the middle of unit wall 150. During the recirculating mode of the air handler 100, vented indoor air recirculates through the first tunnel 130, the first damper 116, the first opening 118, the first and second recirculation paths 110A and 110B, the second damper 120, and the second opening 122, and into the second tunnel 140. Accordingly, the recirculation function of the air handler 100 can be accomplished by a distance of L1. The space represented by L1 includes the space for the core 125.

Figure 3B:
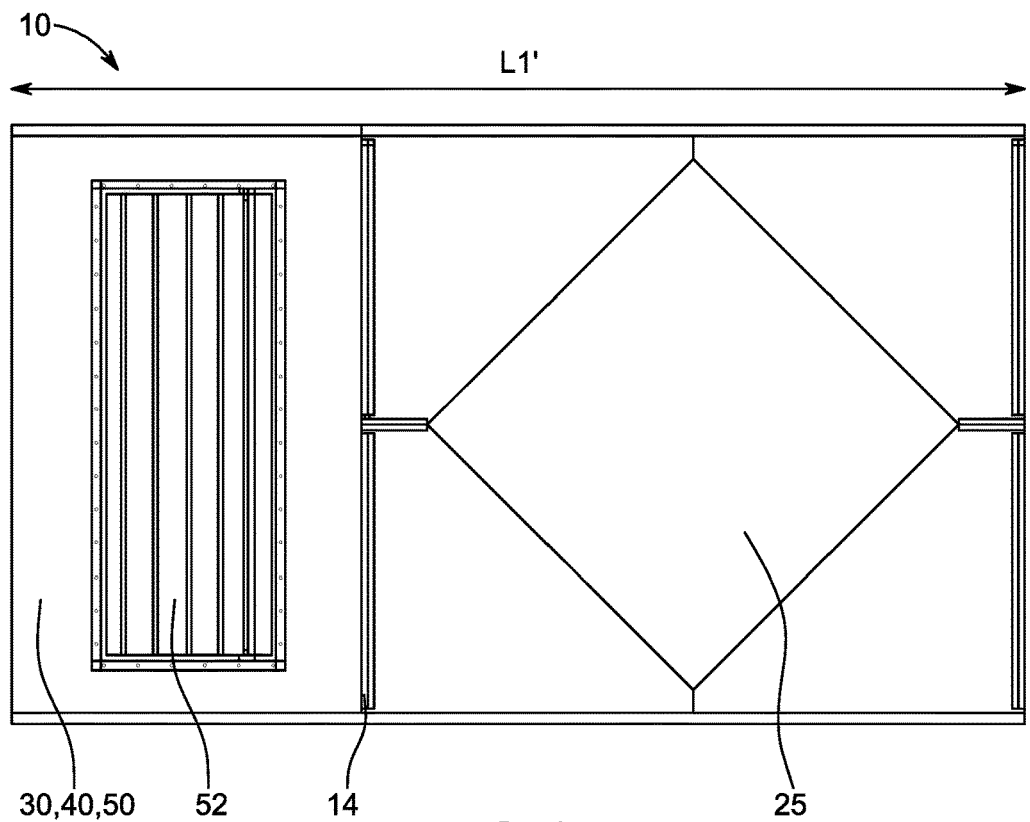
FIG. 3B is a side view of a known air handler to illustrate space savings of the air handler of FIG. 1A.

FIG. 3B is a side view of a known air handler to illustrate space savings of the air handler 100 of FIG. 3A in comparison to said known air handler. As shown in FIG. 3B, an air handler 10 includes a core 25. The size or capacity of the core 25 is comparable to the size or capacity of the core 125 (shown in FIG. 3A). The first tunnel 30 connects to the air handler 10 at a first area of a faceplate 14. The second tunnel 40 connects to the air handler 10 at a second area of the faceplate 14. The first tunnel 30 and the second tunnel 40 are separated by a middle of unit wall 50. A recirculation damper 52 is included adjacent to the faceplate 14 on the middle of unit wall 50. During the recirculating mode of the air handler 10, vented indoor air enters the first tunnel 30 and is blocked by a first damper and a first block off plate on the first area of the faceplate 14 where the first tunnel 30 connects to the faceplate 14. Accordingly, the vented indoor air is forced through the opened recirculation damper 52 into the second tunnel 40. The vented indoor air is further blocked by a second damper and a second block off plate on the second are of the faceplate 14 where the second tunnel 40 connects to the faceplate 14. Accordingly, the vented indoor air flows through the second tunnel 40 back to the controlled space. The recirculation function of the air handler 10 is accomplished in a distance of L' with the core 25 having a similar size and capacity of the core 125 (as shown in FIG. 4A).

As shown by comparing FIGS. 3A and 3B, the damper configurations according to the air handler 100 save a distance of a difference between L1 and L1', for example. This difference is similar to the width of the recirculation damper 52, as shown in FIG. 3B. According to one embodiment, the recirculation damper 52 can be 24 to 48 inches wide. Accordingly, the space savings of the air handler 100 can be 24 to 48 inches.

Figure 4A:
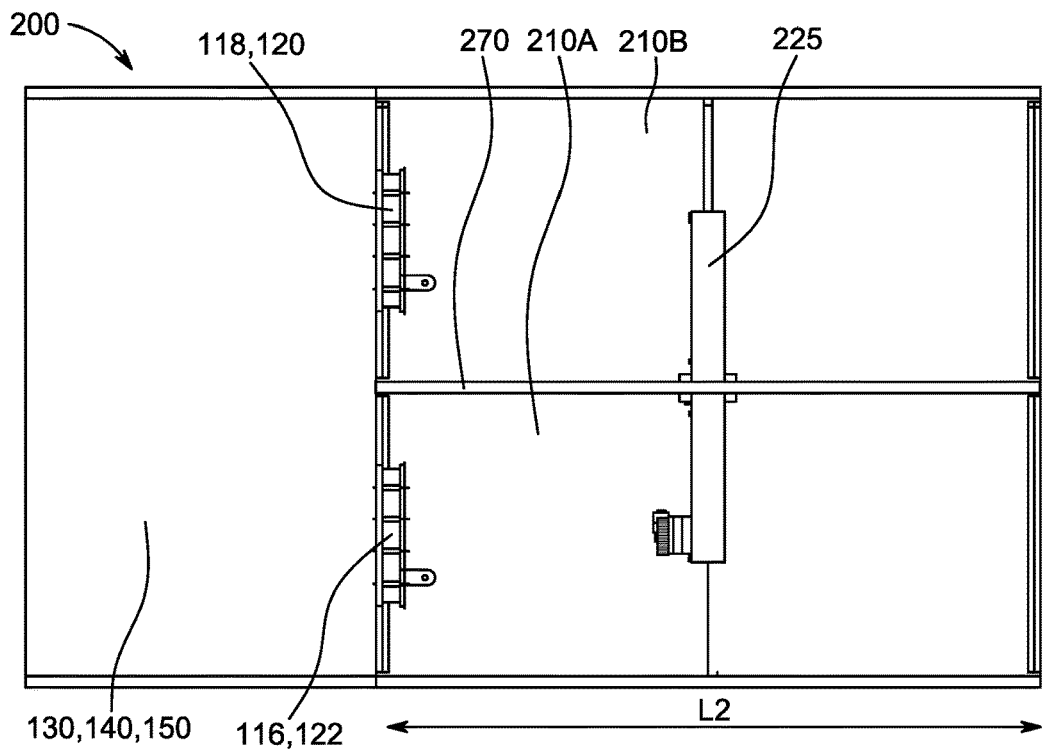
FIG. 4A a side view of the air handler according to the embodiment of FIG. 2A, to illustrate space savings.

FIG. 4A is a side view of the air handler 200 to illustrate space savings. As shown in FIG. 4A, the air handler 200 includes the core 225, the first recirculation path 210A, and the second recirculation path 210B. The first tunnel 130 connects to the air handler 200 at the first area of the faceplate 114. A septum 270 connects the core 225 to the faceplate 114. The second tunnel 140 connects to the air handler 200 at the second area of the faceplate 114. The first tunnel 130 and the second tunnel 140 are separated by the middle of unit wall 150. During the recirculating mode of the air handler 200, vented indoor air recirculates through the first tunnel 130, the first damper 116, the first opening 118, the first and second recirculation paths 210A and 210B, the second damper 120, and the second opening 122, and into the second tunnel 140. Accordingly, the recirculation function of the air handler 200 can be accomplished by a distance of L2. The space represented by L2 includes the space for the core 225.

Figure 4B:
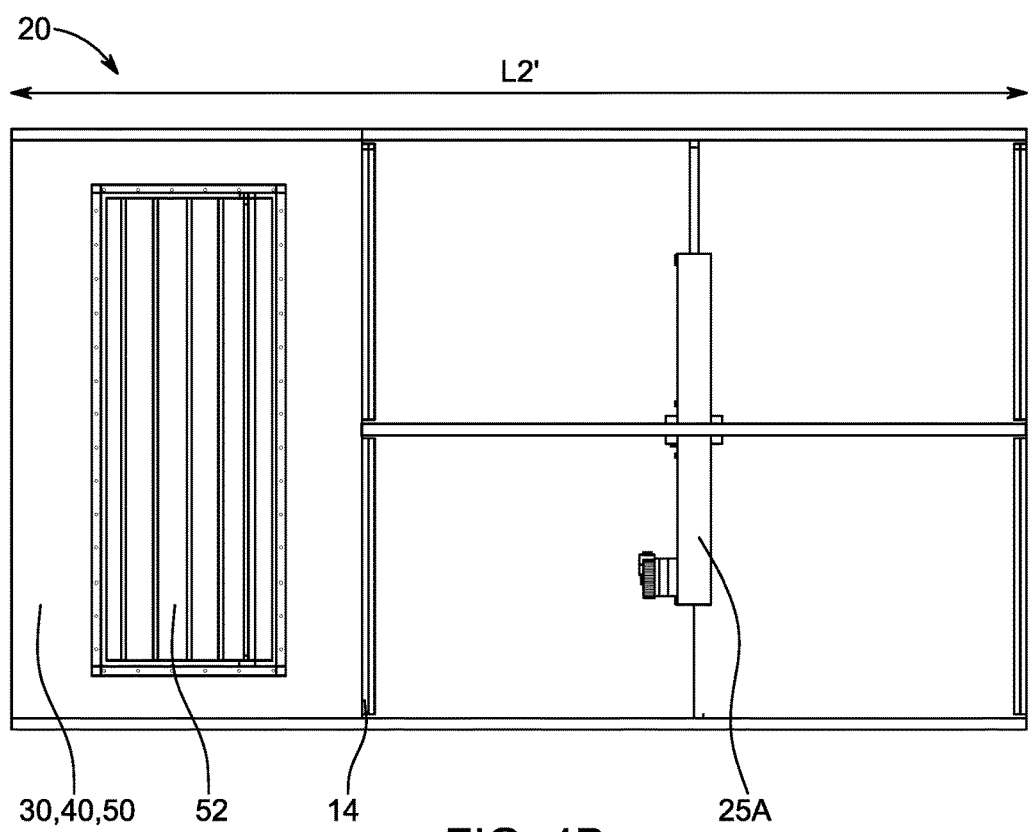
FIG. 4B is a side view of a known air handler to illustrate space savings compared to the air handler of FIG. 2A.

FIG. 4B is a side view of a known air handler 20 to illustrate space savings of the air handler 200 of FIG. 4A. As shown in FIG. 4B, an air handler 20 includes a core 25A. The size or capacity of the core 25A is comparable to the size or capacity of the core 225 (shown in FIG. 4A). The first tunnel 30 connects to the air handler 10 at a first area of a faceplate 14. The second tunnel 40 connects to the air handler 10 at a second area of the faceplate 14. The first tunnel 30 and the second tunnel 40 are separated by a middle of unit wall 50. A recirculation damper 52 is included adjacent to the faceplate 14 on the middle of unit wall 50. During the recirculating mode of the air handler 10, vented indoor air enters the first tunnel 30 and is forced through the opened recirculation damper 52 into the second tunnel 40. Accordingly, the vented indoor air flows through the second tunnel 40 back to the controlled space. The recirculation function of the air handler 20 is accomplished in a distance of L2' with the core 25A having a similar size and capacity of the core 225 (as shown in FIG. 4A).

As shown by comparing FIG. 4A and FIG. 4B, the damper configurations according to the air handler 200 save a distance of a difference between L2 and L2'. This difference is similar to the width of the recirculation damper 52, as shown in FIG. 4B. According to one embodiment, the recirculation damper 52 can be 24 to 48 inches wide. Accordingly, the space savings of the air handler 100 can be 24 to 48 inches.

It is appreciated that pressure drop is inversely proportional to the cross-sectional area of the flow path. Accordingly, when the two air handlers occupying the same amount of space, the air handler with damper configuration according to this disclosure will experience a smaller pressure drop. Additionally, a smaller pressure drop generally correlates to more uniformed downstream airflow. Accordingly, when the two air handlers occupying the same amount of space, the air handler with damper configuration according to this disclosure will have a more uniformed airflow downstream of air handler.

Aspects. It is noted that any of aspects 1-12 can be combined with any one of aspects 13-20.

Aspect 1. An air handler for an HVACR system, comprising:
  a housing having a faceplate, a roof panel, a base panel, a first side panel, and a second side panel;
  a septum protruding into the housing from a first side of the faceplate;
  a core disposed within the housing and having a front edge connected to an edge of the septum, a top edge connected to the roof panel, a bottom edge connected to the base panel, a first side plate connected to the first side panel, and a second side plate connected to the second side panel;
  a first tunnel connected to a first area on the faceplate from a second side of the faceplate, wherein the second side is opposite to the first side of the faceplate;
  a second tunnel connected to a second area of the faceplate from the second side, wherein the second area is disjointed from the first area;
  a first recirculation path defined by the faceplate, the roof panel, the septum, the first side panel, the second side panel, and the core and configured to channel a first portion of airflow from the first tunnel to the second tunnel;
  a second recirculation path defined by the faceplate, the septum, the base panel, the first side panel, the second side panel, and the core and configured to channel a second portion of the airflow from the first tunnel to the second tunnel;
  a first damper disposed in the first area of the faceplate and configured to obstruct the first recirculation path;
  a second damper disposed in the second area of the faceplate and configured to obstruct the second recirculation path;
  a first opening disposed in the first area of the faceplate and connecting the first tunnel to the second recirculation path; and
  a second opening disposed in the second area of the faceplate and connecting the second tunnel to the first recirculation path.

Aspect 2. The air handler of aspect 1, wherein
  the second damper is disposed adjacent to the first side panel and the roof panel, and
  the first damper is disposed adjacent to the second side panel and the base panel.

Aspect 3. The air handler of any one of aspects 1-2, wherein
  the second opening is adjacent to the first side panel and the base panel, and
  the first opening is adjacent to the second side panel and the roof panel.

Aspect 4. The air handler of any one of aspects 1-3, wherein
  the first tunnel is an indoor air inlet from a controlled space, and
  the second tunnel is an indoor air return to the controlled space.

Aspect 5. The air handler of any one of aspects 1-4, wherein
  the core includes a fixed plate heat exchanger or a rotary type wheel heat exchanger.

Aspect 6. The air handler of any one of aspects 1-5, wherein
  the core is in a horizontal configuration substantially parallel to the septum, and
  when the core includes a fixed plate heat exchanger, the fixed plate heat exchanger includes heat transfer plates that are in a vertical configuration, and.
  when the core includes a rotary type wheel heat exchanger the rotary type wheel heat exchanger includes at least two side-by-side wheels.

Aspect 7. The air handler of any one of aspects 1-6, wherein
  the first tunnel and the second tunnel are separated by a middle of unit wall that is substantially perpendicular to the faceplate on a first plane and substantially perpendicular to the septum on a second plane, wherein the second plane is substantially perpendicular to the first plane.

Aspect 8. The air handler of any one of aspects 1-7, wherein
  the first damper includes a plurality of sections that are configured to open or close independently among one another or in unison, and
  the second damper includes a plurality of sections that are configured to open or close independently among one another or in unison.

Aspect 9. The air handler of any one of aspects 1-8, wherein
  the first damper obstructs the first portion of the airflow from entering the first recirculation path when the first damper is in a closed position.

Aspect 10. The air handler of any one of aspects 1-9, wherein the second damper obstructs the second portion of the airflow from entering the second tunnel when the second damper is in a closed position.

Aspect 11. The air handler of any one of aspects 1-10, wherein
the first portion of the airflow is recirculated to the second tunnel through the second opening when the first damper is in an open position, and
the second portion of the airflow is recirculated to the second tunnel through the first opening and the second recirculation path when the second damper is in an open position.

Aspect 12. The air handler of any one of aspects 1-11, wherein
the airflow enters the first tunnel from a controlled space is recirculated into the controlled space when the first and the second dampers are in their open positions.

Aspect 13. The air handler of any one of aspect 1-12, wherein
the core further includes at least one of a bypass damper or a defrost damper.

Aspect 14. A method of providing recirculation capabilities using an air handler with a core, comprising:
opening a first damper and a second damper;
receiving vented indoor air from a controlled space through a first tunnel;
channeling a first portion of the vented indoor air from the first tunnel to a second tunnel through the first damper, a first recirculation path, and a second opening;
channeling a second portion of the vented indoor air from the first tunnel to the second tunnel through a first opening, a second recirculation path, and the second damper; and
returning the first portion of the vented indoor air and the second portion of the vented indoor air from the second tunnel into the controlled space, wherein
the air handler has a housing that includes a faceplate, a roof panel, a base panel, a first side panel, and a second side panel,
the first recirculation path and the second recirculation path are separated by a septum protruding into the housing from a first side of the faceplate,
the housing contains the core having a top edge connected to the roof panel, a bottom edge connected to the base panel, a front edge connected to the septum, a first side plate connected to the first side panel, and a second side plate connected to the second side panel,
the first tunnel connects to the faceplate at a first area of a second side of the faceplate, wherein the second side is opposite to the first side of the faceplate,
the second tunnel connects to the faceplate at a second area of the first side of the faceplate, wherein the second area is disjointed from the first area,
the first damper and the first opening are disposed in the first area on the faceplate,
the second damper and the second opening are disposed in the second area on the faceplate,
the first recirculation path is defined by the roof panel, the faceplate, the first side panel,
the second side panel, the septum, and the core, and the second recirculation path is defined by the base panel, the faceplate, the first side panel, the second side panel, the septum, and the core.

Aspect 15. The method of aspect 14 further comprising:
closing the first damper and the second damper;
obstructing the vented indoor air in the first tunnel from entering into the first recirculation path;
channeling the vented indoor air in the first tunnel into the second recirculation path through the first opening;
channeling the vented indoor air in the second recirculation path into the core;
channeling fresh air into the core;
exchanging energy in the core between the vented indoor and the fresh air;
channeling the fresh air in the core into the first recirculation path;
obstructing the fresh air in the first recirculation path from entering into the first tunnel;
channeling the fresh air in the first recirculation path into the second tunnel through the second opening;
exhausting the vented indoor air from the core after exchanging energy; and
channeling the fresh air from the second tunnel to the controlled space.

Aspect 16. The method of any one of aspects 14-15, wherein
the second damper is disposed adjacent to the first side panel and the roof panel, and the first damper is disposed adjacent to the second side panel and the base panel, and
the first opening is adjacent to the second side panel and the roof panel, and the second opening is adjacent to the first side panel and the base panel.

Aspect 17. The method of any one of aspects 14-16, wherein
the first tunnel is an indoor air inlet from the controlled space, and
the second tunnel is an indoor air return to the controlled space.

Aspect 18. The method of any one of aspects 14-17, wherein
the core includes a fixed plate heat exchanger or a rotary type wheel heat exchanger.

Aspect 19. The method of any one of aspects 14-18, wherein
the core is in a horizontal configuration substantially parallel to the septum, and
when the core includes a fixed plate heat exchanger, the fixed plate heat exchanger includes heat transfer plates of the core are in a vertical configuration, and
when the core includes a rotary type wheel heat exchanger the rotary type wheel heat exchanger includes at least two side-by-side wheels.

Aspect 20. The method of any one of aspects 14-19, wherein
the first tunnel and the second tunnel are separated by a middle of unit wall that is substantially perpendicular to the faceplate on a first plane and substantially perpendicular to the septum on a second plane, wherein the second plane is substantially perpendicular to the first plane.

Aspect 21. The method of any one of aspects 14-20, wherein
the first damper includes a plurality of sections that are configured to open or close independently among one another or in unison, and
the second damper includes a plurality of sections that are configured to open or close independently among one another or in unison.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. An air handler for an HVACR system, comprising:
a housing having a faceplate, a roof panel, a base panel, a first side panel, and a second side panel;
a septum protruding into the housing from a first side of the faceplate;
a core disposed within the housing and having a front edge connected to an edge of the septum, a top edge connected to the roof panel, a bottom edge connected to the base panel, a first side plate connected to the first side panel, and a second side plate connected to the second side panel;
a first tunnel connected to a first area on the faceplate from a second side of the faceplate, wherein the second side is opposite to the first side of the faceplate;
a second tunnel connected to a second area of the faceplate from the second side, wherein the second area is disjointed from the first area;
a first recirculation path defined by the faceplate, the roof panel, the septum, the first side panel, the second side panel, and the core and configured to channel a first portion of airflow from the first tunnel to the second tunnel;
a first damper disposed in the second area of the faceplate and configured to obstruct the first recirculation path; and
a first opening disposed in the first area of the faceplate and connecting the first tunnel to the first recirculation path.

2. The air handler of claim 1, wherein
the first damper is disposed adjacent to the first side panel and the roof panel.

3. The air handler of claim 1, wherein
the first opening is adjacent to the second side panel and the roof panel.

4. The air handler of claim 1, wherein
the first tunnel is an indoor air inlet from a controlled space, and
the second tunnel is an indoor air return to the controlled space.

5. The air handler of claim 1, wherein
the core includes a fixed plate heat exchanger or a rotary type wheel heat exchanger.

6. The air handler of claim 1, wherein
the core is in a horizontal configuration substantially parallel to the septum, and
when the core includes a fixed plate heat exchanger, the fixed plate heat exchanger includes heat transfer plates that are in a vertical configuration, and
when the core includes a rotary type wheel heat exchanger, the rotary type wheel heat exchanger includes at least two side-by-side wheels.

7. The air handler of claim 1, wherein
the first tunnel and the second tunnel are separated by a middle of unit wall that is substantially perpendicular to the faceplate on a first plane and substantially perpendicular to the septum on a second plane, wherein the second plane is substantially perpendicular to the first plane.

8. The air handler of claim 1, wherein
the first damper includes a plurality of sections that are configured to open or close independently among one another or in unison.

9. The air handler of claim 1, wherein
the first damper obstructs the first portion of the airflow from entering the second tunnel when the first damper is in a closed position.

10. The air handler of claim 1, wherein
the first portion of the airflow is recirculated to the second tunnel through the first opening when the first damper is in an open position.

11. The air handler of claim 1, wherein
the airflow enters the first tunnel from a controlled space is recirculated into the controlled space when the first damper is in an open position.

12. The air handler of claim 1, wherein
the core further includes at least one of a bypass damper or a defrost damper.

13. A method of providing recirculation capabilities using an air handler with a core, comprising:
opening a first damper;
receiving vented indoor air from a controlled space through a first tunnel;
channeling a first portion of the vented indoor air from the first tunnel to a second tunnel through a first opening, a first recirculation path, and the first damper; and
returning the first portion of the vented indoor air from the second tunnel into the controlled space, wherein
the air handler has a housing that includes a faceplate, a roof panel, a base panel, a first side panel, and a second side panel,
a septum protrudes into the housing from a first side of the faceplate,
the housing contains the core having a top edge connected to the roof panel, a bottom edge connected to the base panel, a front edge connected to the septum, a first side plate connected to the first side panel, and a second side plate connected to the second side panel,
the first tunnel connects to the faceplate at a first area of a second side of the faceplate, wherein the second side is opposite to the first side of the faceplate,
the second tunnel connects to the faceplate at a second area of the first side of the faceplate, wherein the second area is disjointed from the first area,
the first damper is disposed in the second area on the faceplate,
the first opening is disposed in the first area on the faceplate, and
the first recirculation path is defined by the roof panel, the faceplate, the first side panel, the second side panel, the septum, and the core.

14. The method of claim 13, further comprising:
closing the first damper;
obstructing the vented indoor air in the first recirculation path from entering into the second tunnel;
channeling the vented indoor air in the first tunnel into the first recirculation path through the first opening;
channeling the vented indoor air in the first recirculation path into the core;
channeling fresh air into the core;
exchanging energy in the core between the vented indoor and the fresh air;
channeling the fresh air in the core into the second tunnel through a second opening;
exhausting the vented indoor air from the core after exchanging energy; and channeling the fresh air from the second tunnel to the controlled space.

15. The method of claim 13, wherein
the first damper is disposed adjacent to the first side panel and the roof panel, and
the first opening is adjacent to the second side panel and the roof panel.

16. The method of claim 13, wherein
the first tunnel is an indoor air inlet from the controlled space, and
the second tunnel is an indoor air return to the controlled space.

17. The method of claim 13, wherein
the core includes a fixed plate heat exchanger or a rotary type wheel heat exchanger.

18. The method of claim 13, wherein
the core is in a horizontal configuration substantially parallel to the septum, and
when the core includes a fixed plate heat exchanger, the fixed plate heat exchanger includes heat transfer plates of the core are in a vertical configuration, and
when the core includes a rotary type wheel heat exchanger, the rotary type wheel heat exchanger includes at least two side-by-side wheels.

19. The method of claim 13, wherein
the first tunnel and the second tunnel are separated by a middle of unit wall that is substantially perpendicular to the faceplate on a first plane and substantially perpendicular to the septum on a second plane, wherein the second plane is substantially perpendicular to the first plane.

20. The method of claim 13, wherein
the first damper includes a plurality of sections that are configured to open or close independently among one another or in unison.

* * * * *